(12) United States Patent
Wakamatsu et al.

(10) Patent No.: US 7,595,077 B2
(45) Date of Patent: Sep. 29, 2009

(54) COMPLEX

(75) Inventors: Toshio Wakamatsu, Tokyo (JP); Hideaki Kobayashi, Tokyo (JP)

(73) Assignee: Q.P. Corporation, Tokyo (JP)

( * ) Notice: Subject to any disclaimer, the term of this patent is extended or adjusted under 35 U.S.C. 154(b) by 751 days.

(21) Appl. No.: 10/559,677

(22) PCT Filed: Oct. 29, 2004

(86) PCT No.: PCT/JP2004/016141

§ 371 (c)(1), (2), (4) Date: Dec. 6, 2005

(87) PCT Pub. No.: WO2005/041692

PCT Pub. Date: May 12, 2005

(65) Prior Publication Data

US 2006/0165865 A1 Jul. 27, 2006

(30) Foreign Application Priority Data

Oct. 31, 2003 (JP) .............................. 2003-408182

(51) Int. Cl.
*A23L 1/32* (2006.01)
(52) U.S. Cl. ...................... 426/613; 426/614
(58) Field of Classification Search ................ 426/614
See application file for complete search history.

(56) References Cited

U.S. PATENT DOCUMENTS

| | | | | |
|---|---|---|---|---|
| 5,780,095 A * | 7/1998 | Jackeschky | .................. | 426/614 |
| 5,948,463 A * | 9/1999 | Jackeschky | .................. | 426/614 |
| 6,113,972 A | 9/2000 | Corliss et al. | | |
| 6,177,120 B1 * | 1/2001 | Jackeschky | .................. | 426/614 |
| 6,635,777 B1 | 10/2003 | Kawai et al. | | |
| 6,660,312 B2 | 12/2003 | Tobita et al. | | |
| 7,041,328 B2 * | 5/2006 | Kawai et al. | .................. | 426/605 |
| 7,160,569 B2 * | 1/2007 | Kudou et al. | .................. | 426/605 |
| 2003/0044507 A1 | 3/2003 | Tobita et al. | | |

FOREIGN PATENT DOCUMENTS

| | | |
|---|---|---|
| EP | 1 185 179 B1 | 2/2004 |
| JP | A-04-149194 | 5/1992 |
| JP | A-2001-000117 | 1/2001 |
| JP | A-2001-000138 | 1/2001 |
| JP | A-2002-171931 | 6/2002 |
| JP | 2003-000190 | 1/2003 |
| JP | A-2003-221332 | 8/2003 |
| WO | WO 00/78162 A2 | 12/2000 |

OTHER PUBLICATIONS

Sugano, H. 1961. Journal of Biochemistry 50(6)473-480.*
U.S. Appl. No. 10/559,629, filed Dec. 6, 2005, Kobayashi et al.
English-language translation of the Japanese Office Action.

* cited by examiner

*Primary Examiner*—Carolyn A Paden
(74) *Attorney, Agent, or Firm*—Oliff & Berridge, PLC (57) ABSTRACT

Plant sterol is stably dispersed in a water-based food product or emulsified food product without detracting from the flavor of the food product.

A complex of plant sterol and egg yolk lipoprotein is provided. This complex can be obtained by stirring and mixing egg yolk liquid and plant sterol (preferably 185 parts by mass or less of plant sterol per 1 part by mass of egg yolk solids) in a water-based medium. This complex can be used in food products as a liquid dispersion or can be used as a dried powder.

25 Claims, 3 Drawing Sheets

COMPLEX

TECHNICAL FIELD

The present invention relates to a complex of plant sterol and egg yolk lipoprotein which is useful as a food product material, and to a method for manufacturing the same.

BACKGROUND ART

Plant sterol and plant stanol, which is the saturated form thereof, are known to reduce the total cholesterol concentration and the low-density lipoprotein-cholesterol concentration in blood, and they are considered safe as food products. Because plant sterols are contained in vegetable oil, soy beans, wheat, etc., human beings frequently ingest them, but the amounts ingested are very small, and therefore the expectation of utilizing plant sterols as a food ingredient has increased in recent years.

There are problems, however, because plant sterols are solids at normal temperature (melting point approximately 140° C.) and they are insoluble in water and poorly soluble in oil-based ingredients, that if powdered plant sterols are merely added to various types of food products, the particles of the plant sterol powder coagulate, resulting in a food product with a gritty texture. Therefore, various methods for utilizing plant sterols in food products have been studied.

For example, the following methods have been proposed to obtain an oil-in-water emulsified product such as mayonnaise, etc., that contains plant sterols: a method for obtaining an emulsified product by dissolving the plant sterol in oil to create an oil phase, separately forming a water phase from water and enzyme-treated egg yolk, and then adding the water phase to the oil phase with thorough stirring and mixing (patent document 1); a method for obtaining an oil-in-water emulsified product by heating, mixing and agitating plant sterol, a phospholipid (lecithin), a polyvalent alcohol, water and ethanol to homogenize then, and then gradually adding a food oil or fat thereto (Patent Document 2): and a method for obtaining an emulsified product by using a complex as an emulsifier, where the complex is prepared by dissolving phospholipid and sterol in an organic solvent, and removing the organic solvent to precipitate the phospholipid and the sterol simultaneously (patent document 3).

Patent Document 1: Japanese Patent Application Laid-open No. 2002-171931
Patent Document 2: Japanese Patent Application Laid-open No. 2001-000117
Patent Document 3: Japanese Patent Application Laid-open No. H04-149194

DISCLOSURE OF THE INVENTION

Problems to be Solved by the Invention

However, because both the method in which plant sterol is dissolved all at once in an oil or fat to obtain an emulsion (Patent Document 1) and the method in which an oil or fat is added gradually to a mixture of plant sterol, a phospholipid, a polyvalent alcohol, water and ethanol (Patent Document 2) require the use of an oil or fat, these methods cannot be used for water-based drinks and other food products which contain little or no oil or fat.

Moreover, with the method that utilizes a complex of plant sterol with phospholipid (Patent Document 3), the complex cannot be obtained merely by mixing the plant sterol and phospholipid, and in order to produce that complex, a spray-dry apparatus is used to evaporate the solvent under vacuum because after the plant sterol and phospholipid are dissolved in the organic solvent, the organic solvent must be removed almost instantaneously. In this apparatus, there is a problem that because it is a massive, explosion-proof device, the manufacturing cost of the complex increases. Furthermore, in that complex the phospholipid content is high in comparison with the plant sterol content. As a result, whenever an attempt is made to increase the plant sterol content in the food product, the phospholipid content becomes too high, and the unpleasant taste of the phospholipid adversely affects the flavor of the food product.

By contrast, it is an object of the present invention to allow plant sterol to be added in the desired amount even to a water-based food product or emulsified food product without detracting from the flavor of the food product, and to allow a food product with plant sterol added thereto to provide a smooth texture without any grittiness from the plant sterol.

The inventors discovered (i) that egg yolk and plant sterol in powdered form disperse uniformly when they are stirred and mixed in a water-based medium, (ii) that in this case, when the dilution rate of the egg yolk is high during stirring and mixing, the plant sterol which was floating on the water surface before stirring and mixing will precipitate if left to stand after stirring and mixing, (iii) that this precipitate does not coagulate and exhibits a smooth texture without grittiness, and has much better dispersibility than the original plant sterol when re-dispersed in a water-based medium after having been separated and dried, and that since the egg yolk lipoprotein present in the original egg yolk is not present in the supernatant of the stirred mixture which produced the precipitate, this precipitate is thought to be a complex of plant sterol and egg yolk lipoprotein, (iv) that since this complex is composed mainly of a tasteless, odorless plant sterol (manufactured for example by mixing 4 to 185 parts by mass of the plant sterol per 1 part by mass of yolk solids) with a small egg yolk content, and since moreover the yolk itself has a pleasant flavor and is frequently used as a raw material in various food products, the original texture and flavor of the food products themselves will not be affected even if the complex is added in large quantities, (v) that since the proportion of yolk solids in the complex can be made smaller, there is no coagulation of the proteins in the yolk, and the complex maintains good dispersibility in water-based media even after having been heat sterilized and (vi) that consequently, this complex is extremely useful as a means of adding plant sterols to food products.

That is, the present invention provides a complex of plant sterol and egg yolk lipoprotein, and in particular provides an embodiment in which the egg yolk lipoprotein is lipoprotein that is contained in phospholipase A (hereinafter referred to as PLA) modified egg yolk, decholesterolized egg yolk or PLA modified decholesterolized egg yolk.

The present invention also provides food products containing this complex. Food products in the present invention do not include oil-in-water emulsion food products.

Moreover, the present invention provides as a method of manufacturing this complex a method of stirring and mixing egg yolk lipoprotein and plant sterol in a water-based medium, and more specifically provides a method of either stirring and mixing an egg yolk liquid and plant sterol or stirring and mixing a dilute egg yolk liquid and plant sterol.

Effects of the Invention

With the complex of the present invention, which is a complex of plant sterol and egg yolk lipoprotein, dispersibility of the plant sterol in water-based media is greatly improved by means of a small amount of egg yolk lipoprotein. In particular, this effect is much greater when modified egg yolk such as PLA modified egg yolk, PLA modified decholesterolized egg yolk or the like is used as the egg yolk lipoprotein.

Consequently, using the complex of the present invention a desired amount of plant sterol can be added to a water-based food product or emulsified food product without detracting from the flavor of the food product. Moreover, a smooth texture can be imparted to a food product to which the complex is added, without producing any grittiness derived from the plant sterol.

In addition, when modified egg yolk such as decholesterolized egg yolk, PLA modified decholesterolized egg yolk or the like is used as the egg yolk lipoprotein, because the cholesterol in the egg yolk lipoprotein has been removed, the complex of the present invention contributes still further to the goal of ingesting plant sterols, which is to lower blood total cholesterol concentrations and low-density lipoprotein cholesterol concentrations.

BEST MODE FOR CARRYING OUT THE INVENTION

The present invention is explained in detail below. Unless otherwise noted, the symbol "%" refers to "wt %".

In the present invention, egg yolk is egg yolk in a variety of forms including egg yolk liquid separated from the egg white after an egg is broken, dried egg yolk, frozen egg yolk, heat sterilized egg yolk and the like. This egg yolk encompasses modified egg yolk that has been treated in a variety of ways, such as by lyso-conversion (treatment by phospholipase A), decholesterolization, lyso-decholesterolization and the like.

The term of "egg yolk liquid" refers to an undiluted egg yolk liquid such as egg yolk separated from the egg white after a shell egg is broken, heat sterilized egg yolk, frozen egg yolk that has been thawed, rehydrated egg yolk that is obtained by adding water to dried powdered egg yolk to the extent of normal egg yolk, and egg yolk subjected to various treatments such as lyso-conversion, decholesterolization, lyso-decholesterolization, etc.

The term of "dilute egg yolk liquid" refers to a dilution of the above egg yolk in a water-based medium such as water, liquid egg white, or seasoning (for example, soy sauce or broths).

The term of "egg yolk lipoprotein" refers to a complex comprising proteins, phospholipids that contain both hydrophilic and hydrophobic regions, neutral lipids such as triacylglycerol, cholesterol, etc. This complex has a structure wherein the hydrophilic regions of the proteins and lipoproteins are directed outward, the hydrophilic regions are directed inward, and the neutral lipids are enclosed therein. This egg yolk lipoprotein accounts for approximately 80% of the egg yolk solid that forms the main constituent of egg yolk. Since egg yolk solid accounts for approximately 50% of the egg yolk liquid that has been separated from the egg white after a shell egg is broken (or, when a shell egg is broken industrially, approximately 45% due to egg white contamination), the egg yolk lipoprotein comprises 36% to 40% of the egg yolk liquid.

The egg yolk lipoprotein contained in PLA modified egg yolk is one wherein part or all of the phospholipid constituting the aforementioned egg yolk lipoprotein has been hydrolyzed to form lyso-phospholipid. In the complex of the present invention, it is preferable to use egg yolk lipoprotein contained in PLA modified egg yolk because the dispersibility of plant sterol is markedly increased thereby.

PLA modified egg yolk is obtained by treating egg yolk liquid, which is obtained from raw egg yolk or dried egg yolk powder that has been rehydrated with water, etc., with enzymes to lyso-convert the lipoproteins contained therein. The enzyme used in this treatment is generally phospholipase A (for example, phospholipase $A_1$, phospholipase $A_2$). When the egg yolk is treated with phospholipase A, the phospholipase A acts on the phospholipids constituting the egg yolk lipoprotein, which is the main component of egg yolk, whereby lyso-phospholipid can be obtained wherein the fatty acid residue at position 1 or position 2 of the phospholipids of egg yolk lipoprotein has been hydrolyzed.

For the enzyme treatment conditions, when phospholipase A is used, for example, the reaction is carried out for 2 to 12 hours at 45 to 55° C. and pH 6 to 8 using $10^2$ to $10^4$ units of enzyme activity per 1 kg of egg yolk liquid. Moreover, the lysis ratio (the weight ratio of lyso-phosphatidyl choline to the combined weight of lyso-phosphatidyl choline and phosphatidyl choline after the enzyme treatment) preferred in the present invention is 10% or more, preferably 30% or more when analyzed by an Iatroscan technique (a TLC-FID procedure). If the lysis ratio exceeds 90%, however, the taste tends to be bitter.

On the other hand, the term of "decholesterolized egg yolk" refers to modified egg yolk wherein the cholesterol present in the egg yolk has been reduced or removed. The cholesterol content of raw egg yolk is approximately 1.2%. In the complex of the present invention, it is preferable to use decholesterolized egg yolk because the dispersibility of the plant sterol can be increased and the ingestion of cholesterol accompanying the ingestion of the complex can be decreased.

With respect to the egg yolk decholesterolization treatment, a method using supercritical carbon dioxide is preferred because it is efficient, and preliminary drying of the egg yolk liquid to be decholesterolized enables the decholesterolization treatment to be carried out even more efficiently. In such a case, the present invention places no particular restriction on the means of drying, and with processes such as spray drying, freeze drying, etc., for example, the water content of desugared egg yolk may preferably adjusted to about 1% to 6%. Thus, the cholesterol in the egg yolk is also concentrated by this drying process, and the cholesterol content becomes 2% to 3%.

It is preferable for the egg yolk liquid to be decholesterolized to undergo a desugaring treatment in advance, whereby the decholesterolized dried egg yolk is unlikely to turn brown and it will maintain its bright color. There are some processes utilizing bacteria, yeast, enzymes, etc., for desugaring and, for example, when a yeast is used: about 0.2% yeast is added to the egg yolk liquid, desugaring is performed by placing the liquid in a thermostatic chamber at 30° C. for 3 hours with stirring, after the temperature reaches 60° C. fermentation is stopped by maintaining that temperature for 3 minutes, and then the liquid is cooled to obtain desugared egg yolk liquid. Raw egg yolk liquid contains approximately 0.2% free glucose, but the concentration of free glucose therein can be reduced to 0.02% to 0.1% by this desugaring treatment.

Next, in the decholesterolization treatment using supercritical carbon dioxide, the egg yolk is treated with carbon dioxide at the critical temperature of 31.0 ° C. or higher and the critical pressure of 7.14 MPa or higher, and more specifically, with supercritical carbon dioxide at a temperature of 35 to 45° C. and a pressure of 13 to 50 MPa. The decholesterolization process itself using supercritical carbon dioxide can be performed according to prior art methods. The cholesterol content of decholesterolized dried egg yolk after this treatment, for example, becomes about 0.1% to 1.0% thereby.

A method, in which egg yolk is mixed with edible oil, the edible oil is then separated from the mixture and this mixing and separating procedure is performed one to several times, can serve as an alternative method for removing cholesterol from egg yolk.

A method for measuring cholesterol in the present invention was performed in accordance with "Cholesterol Quantitative Method A" of the "Japanese Standard Tables of Food Composition Analysis Manual" published by The Resources Council Food Composition Subcommittee of the Science and Technology Agency of Japan (January 1997).

The term of "PLA modified decholesterolized egg yolk" refers to the aforementioned PLA modified egg yolk that has been decholesterolized by supercritical carbon dioxide, etc. It is preferable to make the cholesterol content of the modified dried egg yolk about 0.1% to 1.0% after the decholesterolization treatment with supercritical carbon dioxide is performed in the same manner as described above.

On the other hand, plant sterol has a similar structure to cholesterol, it comprises several percent of the lipid-soluble fraction of plants, it has a melting point of about 140° C., and it is a solid at normal temperatures. The present invention does not particularly restrict the type of plant sterol used in the present invention, and examples include β-sitosterol, stigmasterol, campesterol, brassicasterol, etc. Furthermore, plant stanol, which is the saturated form of plant sterol, can also be used, where as the plant stanol, there can be used not only natural plant stanol but also plant stanol obtained by hydrogenating plant sterol.

In the present invention, plant sterol contains the so-called free form of plant sterol as the primary component, but it may contain a slight amount of the esterified form thereof.

Flakes or powdered forms of plant sterol that are commercially available can be used in the present invention, and it is preferable to use a powder with an average particle size of 50 μm or less, particularly 10 μm or less. When flakes or powder with an average particle size greater than 50 μm are used, it is preferable when producing the complex by stirring and mixing with egg yolk that the stirring and mixing is performed while reducing the average particle size using a homogenizer (T.K. Mycolloider®: Tokushu Kika Kogyo Co., Ltd.), whereby the complex of plant sterol with egg yolk lipoprotein will be formed more easily, dispersibility will be increased, and the texture will become smoother thereby.

As a method of measuring the average particle size of the plant sterol, there is a method in which the plant sterol is mixed with pure water at 20° C., measurement is performed with a laser diffraction particle size analyzer (Shimadzu Corporation, SALD-200VER), and a mathematical conversion for volume is performed.

The complex of plant sterol and egg yolk lipoprotein of the present invention is obtained by stirring and mixing the plant sterol and egg yolk lipoprotein, preferably in a water-based medium. It is believed that in this complex the egg yolk lipoprotein covers the plant sterol with the hydrophobic part of the amphiphatic lipoprotein attached to the surface of the hydrophobic plant sterol while the hydrophilic part faces outwards (towards the water), so that the complex can be dispersed in water because its surface is hydrophilic, and can disperse stably in water without coagulating, and does not cause a gritty texture when added to food because there is no coagulation.

Conventionally, phospholipids have been used for obtaining emulsions of plant sterols (see Patent Documents 1 and 2), and egg yolks also contain phospholipids (egg yolk phospholipids). However, because the phospholipids in egg yolks are bound to proteins in the form of egg yolk lipoproteins, the effects on plant sterols of phospholipids which form complexes in egg yolk are completely different from the effects of the phospholipids described in Patent Documents 1 and 2. That is, while egg yolk lipoproteins form complexes with plant sterols when simply stirred and mixed in a water-based medium, it is thought that phospholipids alone cannot form complexes in the same way as egg yolk lipoproteins (see Reference Example 2).

As an embodiment of stirring and mixing plant sterol and egg yolk lipoprotein in the present invention, it is preferable to use, as the egg yolk, a dilute egg yolk liquid prepared by suitably diluting the egg yolk lipoprotein with a water-based medium. In such a case, when performing stirring and mixing with the plant sterol, the egg yolk liquid obtained by breaking shell eggs and separating the yolk from the egg white is not necessary to be diluted with a water-based medium, while dried egg yolk should be rehydrated for use with a water-based medium can used instead. Thus, stirring of the plant sterol and the egg yolk lipoprotein becomes easier and formation of the complex of plant sterol with egg yolk lipoprotein becomes easier thereby, which is preferably. In this situation, if the ratio of water-based medium is too low, the ratio of plant sterol will be relatively increased, and stirring will be requested for a long time because the dilute egg yolk liquid will become more viscous, which is undesirable; conversely, if the ratio of the water-based medium is too high, the ratio of egg yolk lipoprotein in the complex will become exceedingly small, and the dispersibility of the complex in the water-based medium will be decreased, which is also undesirable.

The water-based medium used in preparing the dilute egg yolk liquid is preferably one with a water content of 90% or more by mass, and in addition to pure water, egg white liquid, flavorings (such as soy sauce or stock) and the like can be used for example. Small amounts of oils and fats such as salad oil and the like and organic solvents such as alcohol and the like can be added to the water-based medium. However, if too much of an oil or fat such as salad oil is added, binding between the plant sterol and the egg yolk lipoprotein will be weakened because plant sterol has high affinity for oils and fats, while if too much of an alcohol or other organic solvent is added the egg yolk lipoprotein may be denatured, interfering with production of the complex of plant sterol and egg yolk lipoprotein in both cases, which is also undesired.

In forming the complex of plant sterol with egg yolk lipoprotein by stirring and mixing of egg yolk and plant sterol in a water-based medium, the dispersibility of the complex in the water-based medium can be increased by using a small amount of egg yolk with respect to the plant sterol. For example, to disperse 100 parts by mass of plant sterol in water, 0.54 or more parts by mass of egg yolk solid will be sufficient; in other words, 185 or less parts by mass plant sterol to 1 part by mass egg yolk solid will be sufficient.

Moreover, regarding the mixing ratio of egg yolk to plant sterol when forming the complex, the higher the amount of plant sterol per 1 part by mass of egg yolk solids, the smaller the effect of the egg yolk in the complex on the flavor and texture of a food product when the complex is added to a food product. The flavor of egg yolk needs to be suppressed in some types of food products, in which case it is undesirable to add an excess of egg yolk relative to the plant sterol, and 4 parts by mass or more of plant sterol per 1 part by mass of egg yolk solids is desirable in this case.

For these reasons, the mixing ratio of egg yolk and plant sterol when forming the complex is preferably between 4 and 185 parts by mass of plant sterol per one part by pass of egg yolk solids. Because egg-yolk lipoprotein constitutes approximately 80% of the egg yolk solids, stirring and mixing plant sterol and egg yolk in the aforementioned proportions results in a complex with 5 to 232 parts by mass of plant sterol per 1 part by mass of egg-yolk lipoprotein.

A representative method for producing the complex of plant sterol with egg yolk lipoprotein goes as follows. First, hen's shell eggs are broken and the egg white is removed to obtain egg yolk liquid.

Next, the egg yolk liquid is stirred and mixed with a water-based medium such as pure water, etc., to dilute the egg yolk liquid. It is possible to prepare a complex of plant sterol with egg yolk lipoprotein without diluting the egg yolk liquid, but if the water content is too low, the viscosity will increase as the amount of added plant sterol increases, and a considerable amount of time and energy will be required for the stirring; therefore, when it is necessary to increase the proportion of plant sterol with respect to 1 part by mass of egg yolk lipoprotein, it is desirable to dilute the egg yolk liquid suitably with a water-based medium such as pure water to prepare a dilute egg yolk liquid.

Next, the dilute egg yolk liquid and the plant sterol are stirred and mixed until they are uniform overall using a homogenizer such as T.K. Homomixero™, colloid mill, high pressure homogenizer, T.K. Mycolloider® (Tokushu Kika Kogyo Co., Ltd.), etc., (for example, 10,000 rpm for 5 to 20 minutes) to prepare a complex of plant sterol with egg yolk lipoprotein. The temperature during the stirring and mixing may be normal temperature (20° C.), but it is preferable to heat the mixture to 45 to 55° C.

The resulting complex can be used in food products as a liquid dispersion, but can also be made into a dried powder by freeze drying, spray drying or the like for purposes of long-term storage.

Specific examples of food products which can contain the complex include processed egg products such as egg rolls (Tamagoyaki in Japanese), scrambled eggs, omelets, steamed egg custards (Chawanmushi in Japanese) and the like, steamed fish paste (Kamaboko in Japanese), steamed tubular fish paste (Chikuwa in Japanese) and other seafood products, hamburgers, sausages and other processed meat products, noodles, milk, yogurt-flavored drinks and other drinks, salad dressing, mayonnaise and other condiments, and ice cream, cake, cookies and other confections and the like.

The desirable amount of the complex added to a food product depends on the food product, but given a daily allowance of 1 g or more of food sterol, the added amount is about 0.5 to 10% by mass in the case of milk or omelets for example for purposes of lowering blood cholesterol concentrations.

In the case of food products such as egg roll, steamed egg custard, mayonnaise or the like which contain large amounts of egg yolk as a raw ingredient, the complex can be formed by directly adding the plant sterol in advance to the egg yolk which is the raw ingredient, while in the case of food products such as milk drinks, coffee and the like which do not normally contain egg yolk as a raw ingredient, a complex prepared with the smallest possible amount of egg yolk can be added.

EXAMPLES

The present invention is explained concretely below through examples.

Example 1

Figure 1:
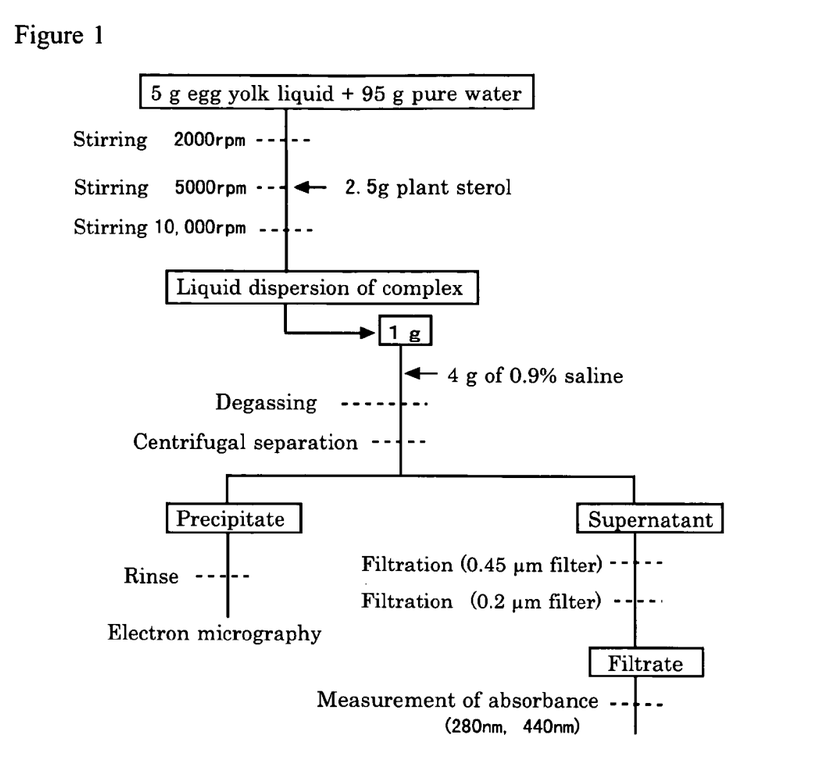
FIG. 1 is a flow sheet demonstrating the method for preparing the complex of plant sterol with egg yolk lipoprotein.

Analysis of Constituent Ingredients of the Complex (1) A complex of plant sterol with egg yolk lipoprotein was prepared from plant sterol and egg yolk as shown below based on the flow sheet of FIG. 1.

First, 95 g of pure water was added to 5 g of egg yolk liquid (2.5 g of egg yolk solids, approximately 2 g of egg yolk lipoprotein in the egg yolk solids), and stirring was performed for 1 minute at 2000 rpm using a homogenizer (Hiscotron, Niti-on Co., Ltd.) to prepare a dilute egg yolk liquid. Next 2.5 g of plant sterol (free form 97.8%, esters 2.2%, mean particle size approximately 3 μm) was added while stirring at 5000 rpm; stirring was then performed at 10,000 rpm for 5 minutes; and a liquid dispersion of complex comprising plant sterol and egg yolk lipoprotein was obtained.

To 1 g of the liquid dispersion obtained thereby was added 4 g of 0.9% saline solution; degassing for 1 minute at a vacuum of 10 mmHg was performed with a vacuum dryer (model VOS-450D, Tokyo Rikakikai Co., Ltd.); and centrifugal separation was performed for 15 minutes at 3000 rpm with a centrifuge (model H-108ND, Kokusan Corporation) to obtain a precipitate and supernatant. The supernatant was filtered with a 0.45 μm filter; and then filtered again with a 0.2 μm filter to remove a complex and the plant sterol that was not formed into a complex.

The absorbance (O.D.) was measured at 280 nm (absorption wavelength of amino acids having an aromatic ring in proteins) using a spectrophotometer (model U-2010, Hitachi, Ltd.) using 0.9% saline solution as a control, and the amount of protein in the filtrate was measured.

The amount of plant sterol added was varied as shown in Table 1, and the absorbances were measured in the same manner (Examples 1-2 to Example 1-8).

Figure 2:
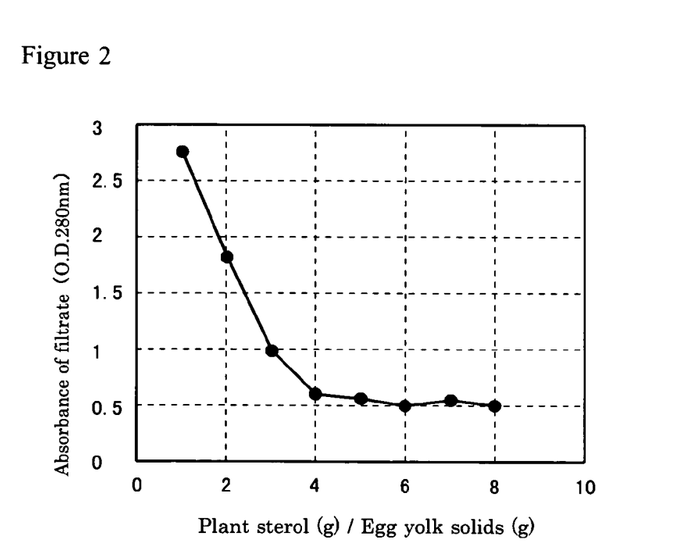
FIG. 2 is a graph showing the relationship between the ratio of plant sterol to egg yolk solid and the absorbance of the supernatant of a liquid dispersion of the complex when a complex is formed from plant sterol and egg yolk.

The results are shown in Table 1 and FIG. 2.

TABLE 1

|  | Amount of plant sterol added (g) | Plant sterol/egg yolk solid content (mass ratio) | Plant sterol/ egg yolk lipoprotein (mass ratio) | Optical density of filtrate (280 nm) |
|---|---|---|---|---|
| Example 1-1 | 2.5 | 1 | 1.3 | 2.770 |
| Example 1-2 | 5.0 | 2 | 2.5 | 1.842 |
| Example 1-3 | 7.5 | 3 | 3.8 | 1.002 |
| Example 1-4 | 10.0 | 4 | 5.0 | 0.626 |
| Example 1-5 | 12.5 | 5 | 6.3 | 0.590 |
| Example 1-6 | 15.0 | 6 | 7.5 | 0.548 |
| Example 1-7 | 17.5 | 7 | 8.8 | 0.577 |
| Example 1-8 | 20.0 | 8 | 10.0 | 0.536 |

From Table 1 and FIG. 2 it is clear that when the amount of sterol was 4 g or less with respect to 1 g of egg yolk solids, the absorbance of the filtrate decreased as the ratio of plant sterol to egg yolk solid increased. Therefore, it can be inferred that the protein contained in the egg yolk became bound to the plant sterol due to the addition of plant sterol to the dilute egg yolk liquid, and the protein concentration in the filtrate decreased. On the other hand, it is clear that when the amount of plant sterol was 4 g or more with respect to 1 g of egg yolk solids, protein not bound to the plant sterol in the filtrate was present in the filtrate because the absorbance of the filtrate became constant.

In addition, when the amount of plant sterol was 4 g or less with respect to 1 g of egg yolk solids, protein bound to the plant sterol was left over in the filtrate, and therefore it is clear that 4 g or more of plant sterol (5 g or more of plant sterol to 1 g of egg yolk lipoprotein) is needed to use 1 g of egg yolk solids to form the complex without leftover starting materials.

(2) In addition to the above measurement at 280 nm, absorbance was measured at 440 nm to detect the protein present in the filtrates of Example 1-1 and Example 1-6 obtained in (1), and the ratio of absorbance at 440 nm and 280 nm was calculated. In this case, 440 nm is the absorption wavelength for the oil-soluble pigment (carotene) contained in the lipoprotein. The results are shown in Table 2.

TABLE 2

| | Amount of plant sterol added | Plant sterol/egg yolk solid content | Plant sterol/egg yolk lipoprotein | Optical density of filtrate | | Ratio of optical densities |
|---|---|---|---|---|---|---|
| | (g) | (mass ratio) | (mass ratio) | 280 nm | 440 nm | (440 nm/280 nm) |
| Example 1-1 | 2.5 | 1 | 1.3 | 2.770 | 1.208 | 0.44 |
| Example 1-6 | 15.0 | 6 | 7.5 | 0.548 | 0.100 | 0.18 |

From Table 2 it is clear that when a proper amount of egg yolk with respect to plant sterol is bound as in Example 1-6, almost no egg yolk lipoprotein remains in the filtrate because the absorbance at 440 nm is extremely low. Therefore, it is clear that the egg yolk lipoprotein forms a complex with the plant sterol.

Furthermore, when the amount of egg yolk with respect to plant sterol is excessive as in Example 1-1, the absorbance at both 280 nm and 440 nm is high, and because the ratio of absorbance between 440 nm and 280 nm is higher than in Example 1-6, it is clear that both egg yolk lipoprotein that was able to form a complex and protein that was not able to form a complex are present in the filtrate, and that more egg yolk lipoprotein is left over than in Example 1-6.

(3) An investigation to identify the respective proteins that do and do not form a complex with the plant sterol was conducted by performing SDS-PAGE (poly acrylamide gel electrophoresis) on the filtrates of Example 1-1 and Example 1-6 obtained in (1).

In this case, as the measurement conditions for electrophoresis a portion of the filtrate was freeze dried, and dissolved in sample buffer, a fixed amount thereof was placed on a 4% to 20% concentration gradient gel, a constant current of 20 mA was applied, and the protein was stained with Coomassie blue. (sample buffer composition: 5.0 mL of distilled water, 1.25 mL of 0.5 M tris-hydrochloride buffer, 1.0 mL of glycerol, 2.0 mL of 10% SDS, 0.5 mL of 2-mercaptoethanol, and 0.05 mL of 0.05% bromophenol blue)

Figure 3:
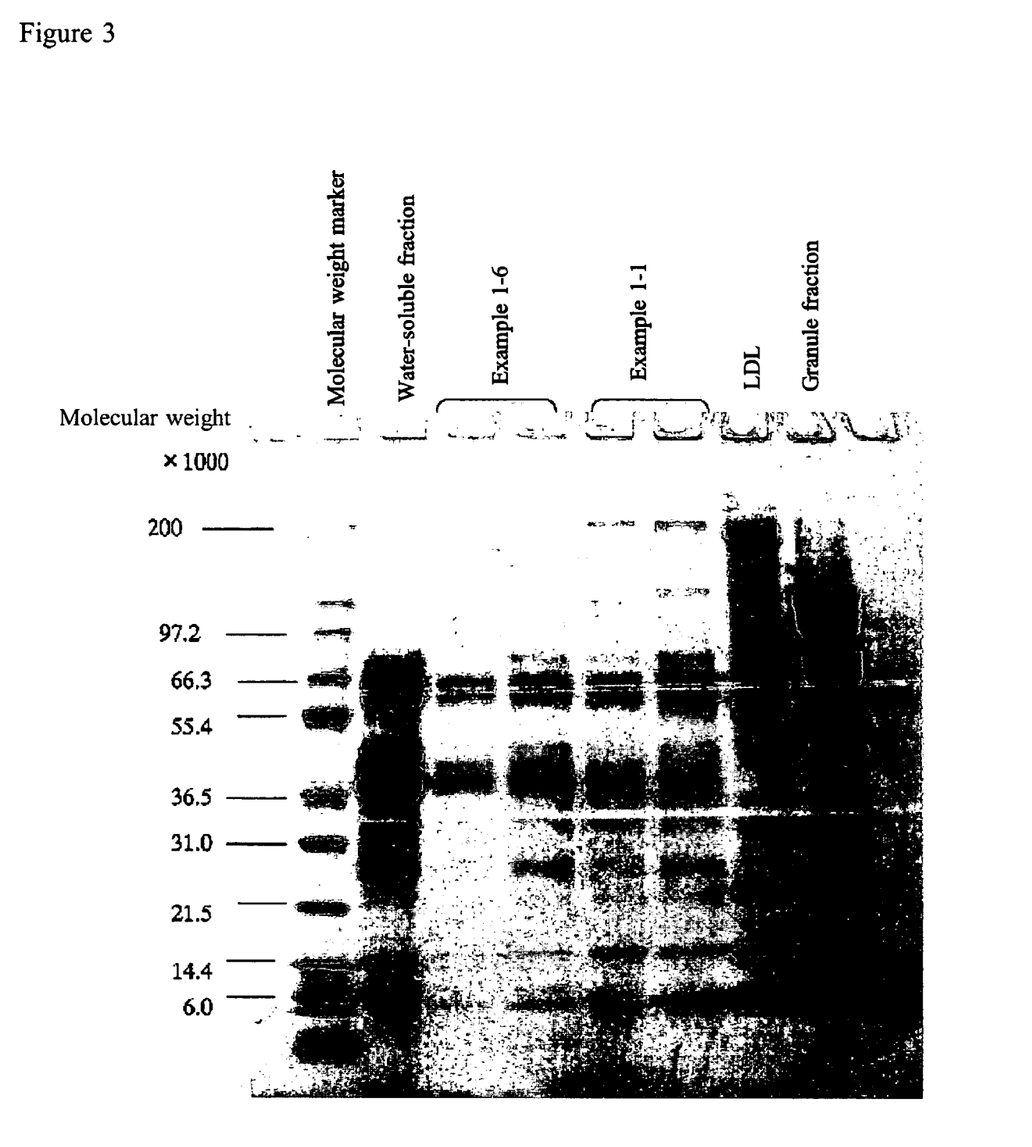
FIG. 3 is an electrophoresis pattern of the filtrate of the liquid dispersion of complex obtained by stirring and mixing of plant sterol and egg yolk.

FIG. 3 shows the electrophoresis pattern.

In the electrophoresis pattern of Example 1-1 wherein the ratio of egg yolk to plant sterol was excessive, both a protein peculiar to the water-soluble fraction (molecular weight of 36.5×1000 in FIG. 3) and a protein peculiar to egg yolk lipoprotein (molecular weight 200×1000 in FIG. 3) were detected but when the ratio of egg yolk to plant sterol was not excessive as in Example 1-6, the protein specific to egg yolk lipoprotein was not detected, and only the protein specific to the water-soluble fraction was detected. As a result, it is clear that in egg yolk the protein not forming a complex is a protein peculiar to the water-soluble fraction and the protein forming the complex is egg yolk lipoprotein.

Figure 4:
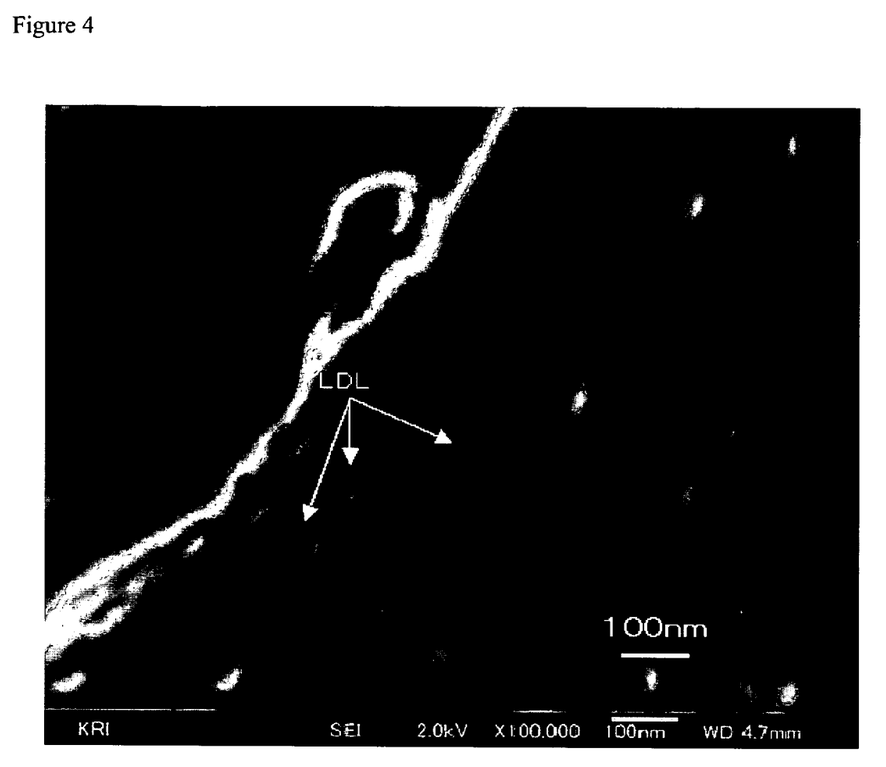
FIG. 4 is an electron micrograph of the complex.

(4) The remaining precipitate that had separated from the supernatant in Example 1-4 was rinsed with approximately a 60-fold amount by mass of physiological saline; centrifugal separation was performed again to obtain a precipitate; a complex powder was obtained by freeze drying the precipitate; the powder was scattered on an electroconductive tape; carbon deposition was performed to render the powder conductive; and a photograph was taken with a field emission scanning electron microscope (model JSM-7400F, JEOL, Ltd.) (acceleration voltage 5 kv, magnification 100,000 times). FIG. 4 shows this photograph. From this photograph it is clear that lipoprotein (LDL) coats the surface of the plant sterol.

Example 2A

Study of Ratio of Plant Sterol and Egg Yolk Liquid, etc., at Time of Preparation of the Liquid Dispersion of Complex The amount of pure water, the amount of egg yolk (45% solids) obtained by the industrial breaking of hen's shell eggs, and the amount of plant sterol were varied as shown in Table 3A; liquid dispersions of the complex of plant sterol with egg yolk lipoprotein were prepared in accordance thereto; and the preferred water content and ratio of plant sterol to egg yolk in the preparation of the complex of plant sterol with egg yolk lipoprotein were studied by investigating the dispersibility and stirrability of these liquid dispersions.

In this case, hen's shell eggs were broken and pure water was added to the egg yolk liquid (45% solids) taken therefrom; the pure water and egg yolk liquid were stirred for 1 minute at 2000 rpm using a homogenizer (Hiscotron, Niti-on Co., Ltd.) to be blend sufficiently; the temperature was raised to 45° C.; plant sterol (the same substance used in Example 1) was added gradually with stirring at 5000 rpm; when the addition was completed, stirring was performed at 10,000 rpm; and a liquid dispersion of plant sterol and egg yolk lipoprotein was obtained.

With respect to the dispersibility of the liquid dispersion, 0.5 g of the liquid dispersion of the complex of plant sterol with egg yolk lipoprotein was placed in a test tube (1.6 cm inside diameter, 17.5 cm long); the dispersion was diluted with 10 mL of 0.9% saline solution and mixed by shaking with a test tube mixer (model TM-151, Iwaki Glass) for 10 sec, let stand for 1 hour, and then placed in a vacuum drier (model VOS-450D, Tokyo Rikakikai Co., Ltd.) and degassed at room temperature (20° C.) at a vacuum of 10 mmHg or less;

if no floating material was seen, a score of "Good" was assigned, and if floating material was seen, a score of "No Good" was assigned. When the specific gravity of the plant sterol was determined by melting the plant sterol by heating, cooling it down, and immersing it in ethanol solutions with different specific gravities to see if it floated or sank, the specific gravity was found to be 0.98; therefore, it is believed that the floating material in the above dispersibility test was plant sterol.

Table 3A shows the results.

TABLE 3A

| Ex. | Composition | | | Concentration of water in dispersion liquid (%) | Plant sterol/egg yolk content (mass ratio) | Plant sterol/egg yolk lipoprotein (mass ratio) | Water/egg yolk solid content (mass ratio) | Dispersibility |
|---|---|---|---|---|---|---|---|---|
| | Egg yolk liquid (g) | Pure water (g) | Plant sterol (g) | | | | | |
| 2A-1 | 100 | 0 | 43.2 | 38.4 | 1.0 | 1.2 | 1.2 | Good |
| 2A-2 | 67 | 33 | 55.7 | 44.9 | 1.8 | 2.3 | 2.3 | Good |
| 2A-3 | 50 | 50 | 58.5 | 48.9 | 2.6 | 3.3 | 3.4 | Good |
| 2A-4 | 33 | 67 | 64.8 | 51.7 | 4.4 | 5.5 | 5.7 | Good |
| 2A-5 | 10 | 90 | 49.4 | 63.9 | 11.0 | 13.7 | 21.2 | Good |
| 2A-6 | 5 | 95 | 35.5 | 72.1 | 15.8 | 20 | 43.4 | Good |
| 2A-7 | 2 | 98 | 20.0 | 82.6 | 22.2 | 27.8 | 110.1 | Good |
| 2A-8 | 0.45 | 99.55 | 20.0 | 83.2 | 98.8 | 123.5 | 492.8 | Good |
| 2A-9 | | | 25.0 | 79.8 | 123.5 | 154.3 | | Good |
| 2A-10 | | | 30.0 | 76.8 | 148.1 | 185.2 | | Good |
| 2A-11 | 0.18 | 99.82 | 5.0 | 95.2 | 61.7 | 77.2 | 1233.6 | Good |
| 2A-12 | | | 10.0 | 90.8 | 123.5 | 154.3 | | Good |
| 2A-13 | | | 15.0 | 86.9 | 185.2 | 231.5 | | Good |
| 2A-14 | | | 20.0 | 83.3 | 246.9 | 308.6 | | No good |
| 2A-15 | | | 25.0 | 79.9 | 308.6 | 385.8 | | No good |

From Table 3A it is clear that to provide the complex with good dispersibility, it is sufficient to use 185 g or less of plant sterol to 1 g of egg yolk solid (approximately 232 g or less of plant sterol to 1 g of egg yolk lipoprotein) (Example 2A-13); in other words, the slight amount of 0.54 or more parts by mass of egg yolk solids (0.43 or more parts by mass of egg yolk lipoprotein) is sufficient to disperse 100 parts by mass of plant sterol in water.

Moreover, in Examples 2A-1 and 2A-2 shown in Table 3A, the viscosity became high when the plant sterol is added, and a stirring and a mixing time of 10 minutes or longer was required; in Examples 2A-3 to 2A-13, however, stirring and mixing could be performed easily in a short time (about minutes). Therefore, it is clear that the preferred water content in the liquid dispersion is 48.9% or higher.

Example 2B

Study of Ratios of Plant Sterol to PLA Modified Egg Yolk Liquid in Preparing the Complex Sodium chloride was added to egg yolk liquid obtained by industrial breaking of hen's shell eggs (solids 45%) to obtain a salted egg yolk liquid with a sodium chloride concentration of 10% by mass, and this was enzyme treated with phospholipase $A_2$ to obtained a lysed salted egg yolk liquid with a lysing ratio of 50%.

Next, liquid dispersions of a complex of plant sterol and egg yolk lipoprotein were prepared by the same methods as in Example 2A above with the amounts of the aforementioned PLA modified egg yolk liquid, pure water and plant sterol varied as shown in Table 3B, and the desirable proportions of plant sterol and PLA modified egg yolk liquid for preparing a complex of plant sterol and egg yolk lipoprotein were investigated as in Example 2A based on the dispersibility of the liquid dispersions.

The results are shown in Table 3B.

TABLE 3B

| Ex. | Composition | | | Concentration of water in dispersion liquid (%) | Plant sterol/egg yolk solid content (mass ratio) | Plant sterol/egg yolk lipoprotein (mass ratio) | Water/egg yolk solid content (mass ratio) | Dispersibility |
|---|---|---|---|---|---|---|---|---|
| | PLA modified egg yolk liquid (g) | Pure water (g) | Plant sterol (g) | | | | | |
| 2B-1 | 0.5 | 99.5 | 20.0 | 83.1 | 98.8 | 123.5 | 492.6 | Good |
| 2B-2 | | | 25.0 | 79.8 | 123.5 | 154.3 | | Good |
| 2B-3 | | | 30.0 | 76.7 | 148.1 | 185.2 | | Good |
| 2B-4 | 0.2 | 99.8 | 5.0 | 95.1 | 61.7 | 77.2 | 1233.3 | Good |
| 2B-5 | | | 10.0 | 90.8 | 123.5 | 154.3 | | Good |
| 2B-6 | | | 15.0 | 86.9 | 185.2 | 231.5 | | Good |
| 2B-7 | | | 20.0 | 83.2 | 246.9 | 308.6 | | Good |
| 2B-8 | | | 25.0 | 79.9 | 308.6 | 385.8 | | No good |

From Table 3B it can be seen that 247 g or less of plant sterol per 1 g of egg yolk solids (about 1.3 times the amount for untreated egg yolk in Example 2A) is sufficient to provide a complex with good dispersibility (see Example 2B-7), or in other words that only a slight amount of 0.40 or more parts by mass of egg yolk solids is sufficient to disperse 100 parts by mass of plant sterol in water.

The reason that the ability of PLA modified egg yolk liquid to disperse plant sterol in water is about 1.3 times that of untreated egg yolk is believed to be that hydrophilicity is increased when phospholipids in the egg yolk lipoproteins are lysed by enzyme treatment, thus raising the hydrophilicity of the complex of egg yolk lipoprotein and plant sterol and improving dispersibility in water.

Example 2C

Study of Ratios of Plant Sterol and Decholesterolized Egg Yolk in Preparing the Complex Egg yolk liquid obtained by industrial breaking of hen's shell eggs (solids 45%) was desugared with yeast and dried, and the cholesterol was removed by use of supercritical carbon dioxide to obtain decholesterolized dried egg yolk with a cholesterol content of 0.25% and a solids component of 95% (measured by drying method at 105° C.)

Next, liquid dispersions of a complex of plant sterol and egg yolk lipoprotein were prepared by the same methods as in Example 2A above with the amounts of the aforementioned decholesterolized dried egg yolk, pure water and plant sterol varied as shown in Table 3C, and the desirable proportions of plant sterol and PLA modified egg yolk liquid for preparing a complex of plant sterol and egg yolk lipoprotein were investigated as in Example 2A based on the dispersibility of the liquid dispersions.

In this case, pure water was added to the decholesterolized dried egg yolk and the decholesterolized egg yolk liquid and pure water were combined by agitation for 2 minutes at 5000 rpm in a homogenizer (Physcotron) and then heated to 45° C., after which the plant sterol (same substance as in Example 1) was added gradually with agitation at 8000 rpm, and following addition agitation was continued at 10000 rpm to obtain a liquid dispersion of the plant sterol and the egg yolk lipoprotein.

Next, dispersibility was evaluated by the same methods as in Example 2A above.

The results are shown in Table 3C

From Table 3C it can be seen that 211 g or less (about 1.1 times the amount for untreated egg yolk in Example 2A) of plant sterol per 1 g of decholesterolized dried egg yolk (as solid basis) is sufficient to provide a complex with good dispersibility (see Example 2C-6), or in other words that only a slight amount of 0.47 (as solid basis) or more parts by mass of decholesterolized dried egg yolk, is sufficient to disperse 100 parts by mass of plant sterol in water.

The reason that the ability of decholesterolized dried egg yolk to disperse plant sterol in water is about 1.1 times that of untreated egg yolk is thought to be that in the case of the decholesterolized dried egg yolk, cholesterol and neutral lipids which do not contribute to complex formation with plant sterols have been removed from the egg yolk lipoproteins by the process of decholesterolization, thus increasing the relative concentrations of proteins and phospholipids which contribute to complex formation with plant sterols.

Example 2D

Study of Ratios of Plant Sterol and PLA Modified Decholesterolized Egg Yolk in Preparing the Complex Egg yolk liquid obtained by industrial breaking of hen's shell eggs (solids 45%) was treated with phospholipase $A_2$ to obtain PLA modified egg yolk liquid with a lysing ratio of 55%. Next, this egg yolk liquid was dried, and the cholesterol was removed with supercritical carbon dioxide to obtain PLA modified decholesterolized dried egg yolk with a cholesterol content of 0.15% and a solids component of 96% (measured by 105° C. drying method).

Next, liquid dispersions of a complex of plant sterol and egg yolk lipoprotein were prepared by the same methods as in Example 2C with the amounts of the PLA modified decholesterolized dried egg yolk, pure water and plant sterol varied as shown in Table 3D, and the desirable proportions of plant sterol and PLA modified decholesterolized egg yolk for preparing a complex of plant sterol and egg yolk lipoprotein were investigated as in Example 2A based on the dispersibility of the liquid dispersions.

TABLE 3C

| | Composition | | | Concentration | Plant sterol/ | Water/ | |
|---|---|---|---|---|---|---|---|
| Ex. | Decholesterolized dry egg yolk (g) | Pure water (g) | Plant sterol (g) | of water in dispersion liquid (%) | decholesterolized egg yolk solid content (mass ratio) | decholesterolized egg yolk solid content (mass ratio) | Dispersibility |
| 2C-1 | 0.5 | 99.5 | 20.0 | 82.9 | 42.1 | 209.5 | Good |
| 2C-2 | | | 25.0 | 79.6 | 52.6 | | Good |
| 2C-3 | | | 30.0 | 76.6 | 63.2 | | Good |
| 2C-4 | 0.1 | 99.9 | 10.0 | 90.8 | 105.3 | 1051.6 | Good |
| 2C-5 | | | 15.0 | 86.9 | 157.9 | | Good |
| 2C-6 | | | 20.0 | 83.3 | 210.5 | | Good |
| 2C-7 | | | 25.0 | 79.9 | 263.2 | | No good |
| 2C-8 | | | 30.0 | 76.9 | 315.8 | | No good |

The results are shown in Table 3D.

TABLE 3D

| Ex. | Composition PLA modified decholesterolized dry egg yolk (g) | Pure water (g) | Plant sterol (g) | Concentration of water in dispersion liquid (%) | Plant sterol/PLA modified decholesterolized egg yolk solid content (mass ratio) | Water/PLA modified decholesterolized egg yolk solid content (mass ratio) | Dispersibility |
|---|---|---|---|---|---|---|---|
| 2D-1 | 0.5 | 99.5 | 20.0 | 82.9 | 41.7 | 207.3 | Good |
| 2D-2 | | | 25.0 | 79.6 | 52.1 | | Good |
| 2D-3 | 0.1 | 99.9 | 10.0 | 90.8 | 104.2 | 1040.7 | Good |
| 2D-4 | | | 15.0 | 86.9 | 156.3 | | Good |
| 2D-5 | | | 20.0 | 83.3 | 208.3 | | Good |
| 2D-6 | | | 25.0 | 79.9 | 260.4 | | Good |
| 2D-7 | | | 30.0 | 76.8 | 312.5 | | Good |
| 2D-8 | | | 35.0 | 74.0 | 364.6 | | No good |

From Table 3D it can be seen that 313 g or less of plant sterol (about 1.7 times the amount for untreated egg yolk in Example 2A) per 1 g of PLA modified decholesterolized dried egg yolk (as solid basis) is sufficient to provide a complex with good dispersibility (see Example 2D-7), or in other words that only a slight amount of 0.32 or more parts by mass (as solid basis) of PLA modified decholesterolized dried egg yolk is sufficient to disperse 100 parts by mass of plant sterol in water.

The reason that the ability of PLA modified decholesterolized dried egg yolk to disperse plant sterol in water is so great, about 1.7 times that of untreated egg yolk is attributed to a synergistic effect in which the hydrophilicity of the egg yolk lipoproteins is improved by the aforementioned lysing treatment, while at the same time the proteins and phospholipids in the egg yolk lipoproteins which contribute to complex formation are concentrated due to decholesterolization.

Example 3

Plant Sterol Added Egg Roll

Egg yolk liquid separated from industrially broken hen's shell eggs (solids 45%) was placed in a homogenizer (Nition Medical and Scientific, Physcotron) and agitated at 5000 rpm as plant sterol (same substance as in Example 1) was gradually added to concentrations of 5% (0.15 g plant sterol per 1 g egg yolk lipoprotein), 10% (0.31 g plant sterol per 1 g egg yolk lipoprotein) and 20% (0.69 g plant sterol per 1 g egg yolk lipoprotein). Addition was followed by agitation for 5 minutes at 10,000 rpm to prepare liquid dispersions of complexes of plant sterol and egg yolk lipoprotein with three different plant sterol concentrations (Examples 3-1 through 3-3). Since in Example 1 (1) when there was 5 g or less of plant sterol per 1 g of egg yolk lipoprotein there was too much egg yolk lipoprotein in the liquid dispersion, the egg yolk lipoprotein is present in excess in the liquid dispersions of these Examples 3-1 through 3-3.

Egg roll slurries were prepared based on the proportions shown in Table 4 using the resulting complex liquid dispersions, and egg rolls were prepared and tasted.

An egg roll was also prepared as in Example 3 without any plant sterol as a control, and tasted.

The results are shown in Table 5.

TABLE 4

| Egg roll slurry composition (g) | |
|---|---|
| Composition | (g) |
| Dispersion liquid of complex | 18 |
| Egg white liquid | 62 |
| Very refined sugar | 7 |
| Sweet cooking sake | 0.5 |
| Soy sauce | 0.5 |
| Pure water | 12 |
| (Total) | (100) |

TABLE 5

| | Amount of plant sterol added to dispersion liquid (%) | Plant sterol in dispersion liquid/egg yolk lipoprotein (mass ratio) | Concentration of plant sterol in egg roll (%) | Texture of egg roll | Egg taste in egg roll |
|---|---|---|---|---|---|
| Control | 0 | 0 | 0 | Moderate hardness, smooth, excellent | Present |
| Example 3-1 | 5 | 0.15 | 0.9 | Same as above | Present |
| Example 3-2 | 10 | 0.31 | 1.8 | Same as above | Present |
| Example 3-3 | 20 | 0.69 | 3.6 | Same as above | Present |

From Table 5 it can be seen that in this example, despite the addition of plant sterol, there was no grittiness as well as the control which has no plant sterol because the plant sterol formed a complex with the egg yolk lipoprotein, so it was possible to prepare egg rolls with added plant sterol which had good egg taste and texture.

Example 4

Plant Sterol-Added Drink (1) Preparation of Complex 9982 g of pure water was added to 18 g of egg yolk liquid obtained by the breaking of hen's shell eggs (50% egg yolk solids, approximately 7.2 g of egg yolk lipoprotein in the egg yolk liquid); the liquid was stirred at 5000 rpm for 3 minutes until it becomes homogeneous using a homogenizer (T.K. Homomixer®, Tokushu Kika Kogyo Co., Ltd.); then the stirring speed was raised to 12,000 rpm and 1500 g of plant sterol (the same substance used in Example 1) (208 parts by mass of plant sterol to 1 part by mass of egg yolk lipoprotein) was gradually added; and after addition was complete stirring was continued for another 5 minutes. Next, the mixture was heated to 61° C. for 4 minutes while stirring with a marine propeller type stirrer for low-temperature sterilization to prepare the liquid dispersion of the complex of plant sterol with egg yolk lipoprotein.

A portion of the liquid dispersion obtained thereby was freeze-dried, and after it was pulverized with a mortar, it was passed through a 30-mesh sieve to obtain a powder containing the complex of plant sterol with egg yolk lipoprotein (complex content ratio 99.88%).

(2) Drink with Liquid Dispersion of Complex Added 3.07 g (0.4 g as plant sterol) of the dispersion of plant sterol and egg yolk lipoprotein prepared in (1) was added to 17 g each of commercial milk (pH 6.72) and a commercial yogurt-flavored drink (pH 3.67), and agitated at 10,000 rpm for 2 minutes with a homogenizer (Nichion Medical and Scientific, Physcotron) to prepare drinks with added plant sterol. Test tubes (inner diameter 1.6 cm, height 17.5 cm) were filled with the entire amounts and left for 3 hours, 20 hours or 2 days at 5° C., the dispersion state of each was observed, and the heights of the floating layers which formed inside the test tubes were measured.

As a control, 0.4 g of plant sterol (the same substance used in Example 1) was added directly to each drink in place of the complex of plant sterol and egg yolk lipoprotein.

The results are shown in Table 6.

TABLE 6

| | | Control | | Example 4: complex-added drink | |
|---|---|---|---|---|---|
| | Standing time | Floating layer (mm) | Lower layer | Floating layer (mm) | Lower layer |
| Lactobasillus beverage | 3 hours | 16 | Homogenous | Absent | Homogenous |
| | 20 hours | 19 | Homogenous | Absent | Homogenous |
| | 2 days | 19 | Homogenous | Absent | Homogenous |
| Milk | 3 hours | 15 | Homogenous | Absent | Homogenous |
| | 20 hours | 17 | Homogenous | Absent | Homogenous |

From Table 6 it can be seen that the yogurt-flavored drink and milk with the liquid dispersions of complex added exhibited no floating matter even when stored for 2 days or 20 hours at 5° C., but when the plant sterol was added directly to the drink without forming a complex, even thought it was dispersed uniformly, it was not stably dispersed and floated within 3 hours.

Example 5

Re-Dispersion of Powdered Complex

The powder (complex content 99.88%) obtained in Example 4 (1) containing a complex of plant sterol and egg yolk lipoprotein was taken in test tubes (inner diameter 16 mm, height 17.5 cm) in amounts of 0.202 g, 0.405 g and 1.52 g, 0.9% of sodium chloride solution was added to each to adjust them to 10 g, and they were exposed to ultrasound for 1 minute using an ultrasound generator (Kokusai Electric Eltech, model Sine/Sonic 100) and let stand at room temperature for 1 hour, and the dispersion state of the complex and presence or absence of a floating layer were observed.

For a control, 0.2 g, 0.4 g, and 1.5 g of plant sterol (the same substance used in Example 1) were dispersed directly in saline solution instead of the powder containing the complex, and observations were made on the dispersion state and the presence or absence of a floating layer.

The results are shown in Table 7.

TABLE 7

| Concentration of plant sterol in dispersion liquid (%) | Control | | Example 5: Liquid of re-suspended complex powder | |
|---|---|---|---|---|
| | Floating layer | Lower layer | Floating layer | Lower layer |
| 2 | Present | Transparent | Absent | Homogenously white suspension |
| 4 | Present | Transparent | Absent | Homogenously white suspension |
| 15 | Present | Transparent | Absent | Homogenously white suspension |

As shown in Table 7, in the control the plant sterol did not disperse, a floating layer was seen at each of the added amounts, and the lower layer was transparent. In contrast, when the complex powder prepared according to Example 5 was re-dispersed, the liquid dispersions were cloudy throughout at each of the added amounts, and little amount of precipitate was seen.

Reference Example 1

Mayonnaise-Like Emulsified Food Product

The following complex of plant sterol with egg yolk lipoprotein were prepared in the composition shown in Table 8.

First, pure water was added to egg yolk liquid (made by QP Corporation, Egg Yolk with Salt (40.5% egg yolk solids, 10% added salt)) and the liquid was placed in a mixer (T.K. Homomixer®, Tokushu Kika Kogyo Co., Ltd.) and mixed for 3 minutes at 5000 rpm to blend the water and egg yolk. Next the mixer speed was set to 14,000 rpm and plant sterol (the same substance used in Example 1) was gradually added while stirring was continued, and the mixture was stirred for 20 minutes to obtain a liquid dispersion of the complex of plant sterol with egg yolk lipoprotein.

Using the liquid dispersion of complex obtained thereby, a mayonnaise-like emulsified food product was prepared in the following manner using the composition shown in Table 9. First, the liquid dispersion of the complex of plant sterol with egg yolk lipoprotein was placed in a kitchen mixer; pure water and egg white liquid were added and the resulting liquid was mixed for 1 minute; next, salt, modified starch, mustard powder, xanthan gum, refined sugar, and monosodium glutamate were added, and stirring was continued for 1 minute; canola oil was gradually added, and stirred for 3 minutes; vinegar was gradually added and stirred for 1 minute; and degassing was performed by stirring for 1 minute under a vacuum of 0 to 10 mmHg to obtain the mayonnaise-like emulsified food product.

As a control, a mayonnaise-like emulsified food product was prepared after plant sterol was dispersed in canola oil in accordance with the composition shown in Table 10. More specifically, plant sterol was added to canola oil and mixed for 10 minutes in a mixer (T.K. Homomixer®, Tokushu Kika Kogyo Co., Ltd.) at 10,000 rpm to prepare an oil dispersion of plant sterol. Next, egg yolk liquid (made by QP Corporation, Egg Yolk with Salt (10% added salt)), egg white liquid, and pure water were placed in a kitchen mixer and mixed for 1 minute; salt, modified starch, mustard powder, xanthan gum, refined sugar, and monosodium glutamate were added and stirred for 1 minute; the oil dispersion of plant sterol was gradually added and stirred for 3 minutes; vinegar was gradually added and stirred for 1 minute; and degassing was performed by stirring for 1 minute under a vacuum of 0 to 10 mmHg to prepare the mayonnaise-like emulsified food product.

The mayonnaise-like food product from Reference Example 1 and the Control Example were subjected to a taste test to investigate the texture. In addition, a separation test was performed by placing 120 of each mayonnaise-like emulsified food product in a 200 g capacity flexible polyethylene bottle, squeezing and releasing the uncapped flexible bottle repeatedly 10 times, and examining the emulsification appearance of the mayonnaise-like emulsified food product immediately following the separation test and after one day of storage following the separation test.

The results are shown in Table 11.

TABLE 8

Composition of Dispersion Liquid of Complex of Plant Sterol and Egg Yolk Lipoprotein

| Composition | Parts by mass |
| --- | --- |
| Egg yolk liquid (10% added salt) | 11.04 |
| (Egg yolk lipoprotein) | (3.6) |
| Plant sterol | 6.33 |
| Pure water | 12.63 |
| (Total) | (30.00) |

TABLE 9

Composition of Mayonnaise-like Emulsified Food of Reference Example 1

| Composition | (%) |
| --- | --- |
| Canola oil | 28 |
| Dispersion liquid of complex of plant sterol and egg yolk lipoprotein | 30 |
| Egg white liquid | 3 |
| Table vinegar | 7 |
| Sodium chloride | 1.3 |
| Modified starch | 3.5 |
| Mustard powder | 0.2 |
| Xanthan gum | 0.5 |
| Very-refined sugar | 0.5 |

TABLE 9-continued

Composition of Mayonnaise-like Emulsified Food of Reference Example 1

| Composition | (%) |
| --- | --- |
| Sodium glutamate | 0.5 |
| Pure water | 25.5 |
| (Total) | (100) |

TABLE 10

Composition of the Control Mayonnaise-like Emulsified Food

| Composition | (%) |
| --- | --- |
| Canola oil | 28.0 |
| Egg yolk liquid (10% added salt) | 11.04 |
| Plant sterol | 6.33 |
| Egg white liquid | 3.0 |
| Table vinegar | 7.0 |
| Sodium chloride | 1.3 |
| Modified starch | 3.5 |
| Mustard powder | 0.2 |
| Xanthan gum | 0.5 |
| Very-refined sugar | 0.5 |
| Sodium glutamate | 0.5 |
| Pure water | 38.13 |
| (Total) | (100.00) |

TABLE 11

| | Taste | Immediately after separation test | After one day conservation following separation test |
| --- | --- | --- | --- |
| Reference example 1 | Smooth | No separation | No separation |
| Control | Gritty | Cracks formed and oil seeping therefrom | Seeping oil increased more than immediately after separation test |

The results in Table 11 shows that in the control sample, wherein plant sterol was dispersed in canola oil in advance, a stable mayonnaise-like emulsified food product was not obtained because the texture was rough and immediately after the separation test cracks appeared with oil seepage, etc.

In contrast, by means of the mixing of plant sterol with egg yolk in advance to form the complex, the mayonnaise-like emulsified food product of Reference Example 1 showed a smooth texture and a stable emulsification state without cracks and oil seepage.

Reference Example 2

Difference in Emulsion Stabilizing Power Between the Liquid Dispersions of the Complex of Plant Sterol with Egg Yolk Lipoprotein and of the Complex of the Liquid Dispersion of Plant Sterol with Phospholipid in a Mayonnaise-Like Emulsified Food Product A mayonnaise-like emulsified food product using the liquid dispersion of the complex of plant sterol with egg yolk lipoprotein and a mayonnaise-like emulsified food product using a liquid dispersion of plant sterol and phospholipid were prepared as shown below, and they were compared in respect of an emulsification stability.

(1) Preparation of Mayonnaise-Like Emulsified Food Product

First a liquid dispersion of the complex of plant sterol with egg yolk lipoprotein was prepared in accordance with the method of Reference Example 1 using the composition shown in Table 12. In this instance, egg yolk liquid (45% solids) obtained by the breaking hen's shell eggs was used.

TABLE 12

Composition of Dispersion Liquid of Complex of Plant Sterol and Egg Yolk Lipoprotein

| Composition | parts by mass |
|---|---|
| Egg yolk liquid | 2.2 |
| (Egg yolk lipoprotein) | (0.8) |
| Plant sterol | 6.0 |
| Pure water | 15.8 |
| (Total) | (24.0) |

On the other hand, a liquid dispersion of plant sterol and phospholipid was prepared as a control in the following manner using the composition shown in Table 13. More specifically, egg yolk liquid obtained by the breaking of hen's shell eggs (45% egg yolk solids) was spray dried, and after the dried egg yolk was obtained, the lipids were extracted with ethanol, the ethanol was removed, and the neutral lipids were removed with acetone to obtain phospholipid (powder).

Pure water was added to the phospholipid and blended by mixing for 2 minutes at 5000 rpm with a mixer (Hiscotron, Nition Co., Ltd.); the mixture was heated to 45° C., and plant sterol (the same substance used in Example 1) was gradually added with stirring at 5000 rpm; and when the addition was completed, the mixture was stirred additionally for 5 minutes at 10,000 rpm to prepare the liquid dispersion of plant sterol and phospholipid.

TABLE 13

Composition of Complex of Plant Sterol and Phospholipid

| Composition | Parts by mass |
|---|---|
| Phospholipid (powder) | 1.2 |
| Plant sterol | 6.0 |
| Pure water | 16.8 |
| (Total) | (24.0) |

Using the liquid dispersions obtained in the above manner, mayonnaise-like emulsified food products were prepared in accordance with the compositions of Table 14 and Table 15. The method of preparation was the same as in Reference Example 1 except the egg yolk liquid (45% solids) was also placed in the kitchen mixer with the liquid dispersion, egg white liquid, and pure water, and all were mixed together.

TABLE 14

Composition of Mayonnaise-like Emulsified Food of Reference Example 2

| Composition | (%) |
|---|---|
| Canola oil | 28.0 |
| Dispersion liquid of complex of plant sterol and egg yolk lipoprotein | 24.0 |
| Egg yolk liquid | 8.0 |
| Egg white liquid | 3.0 |
| Table vinegar | 7.0 |
| Sodium chloride | 1.3 |
| Modified starch | 3.5 |
| Mustard powder | 0.2 |
| Xanthan gum | 0.5 |
| Very-refined sugar | 0.5 |
| Sodium glutamate | 0.5 |
| Pure water | 23.5 |
| (Total) | (100.0) |

TABLE 15

Composition of Reference Mayonnaise-like Emulsified Food

| Composition | Parts by mass |
|---|---|
| Canola oil | 28.0 |
| Dispersion liquid of complex of plant sterol and phospholipid | 24.0 |
| Egg yolk liquid | 8.0 |
| Egg white liquid | 3.0 |
| Table vinegar | 7.0 |
| Sodium chloride | 1.3 |
| Modified starch | 3.5 |
| Mustard powder | 0.2 |
| Xanthan gum | 0.5 |
| Very-fined sugar | 0.5 |
| Sodium glutamate | 0.5 |
| Pure water | 23.5 |
| (Total) | (100.0) |

(2) Comparison of Emulsification Stability

The emulsification stability of the mayonnaise-like emulsified food product using the liquid dispersion of the complex of plant sterol with egg yolk lipoprotein and that of the mayonnaise-like food product using the liquid dispersion of plant sterol and phospholipid were investigated in the following manner.

First, 200 g of each mayonnaise-like emulsified food product was placed in a 200 g capacity, flexible polyethylene bottle. A separation test (emulsification stability test) was performed on each product after it was capped and stored for 1 day at 30° C. and after it was capped and stored for 3 months at 30° C.

For the separation test, the bottle was uncapped, 80 g of the contents were removed, the center of the uncapped flexible bottle was squeezed with the hand and released repeatedly 10 times, and the emulsification state was observed immediately after those repetitions.

The results are shown in Table 16.

TABLE 16

| | After one day (30° C.) | After 3 months (30° C.) |
|---|---|---|
| Dispersion liquid of complex of plant sterol and egg yolk lipoprotein | No change Emulsification is stable | No change Emulsification is stable |
| Dispersion liquid of complex of plant sterol and phospholipid | Slight oil seepage | Crack appeared and oil started to separate |

From the results shown in Table 16 it is clear that mayonnaise-like emulsified food product using the liquid dispersion of plant sterol and phospholipid, oil seepage occurred after only 1 day, and after 3 months cracks appeared and oil seepage had progressed even though a sufficient amount of egg yolk liquid for the general preparation of mayonnaise was used (the content of egg yolk liquid in mayonnaise-like emulsified food products on the market is 3% to 15%). It is inferred that the cause of this oil separation is that the oil adhered to the hydrophobic surface of the particles of plant sterol because no complex between the plant sterol and lipoprotein was formed, and the breakdown of emulsification proceeded from that oil-adhered point.

In contrast, in the mayonnaise-like emulsified food product using the liquid dispersion of the complex of plant sterol with egg yolk lipoprotein, no separation occurred even after 3 months, and the emulsification stability was excellent. It is assumed that this is because the plant sterol and the egg yolk lipoprotein formed a complex.

The invention claimed is:

1. A complex comprising plant sterol and egg yolk lipoprotein, wherein a component ratio of the plant sterol to the egg yolk lipoprotein is 5 to 232 parts by mass of plant sterol per 1 part by mass of egg yolk lipoprotein.

2. The complex according to claim 1, wherein the egg yolk lipoprotein is lipoprotein contained in PLA (phospholipase A) modified egg yolk, decholesterolized egg yolk or PLA modified decholesterolized egg yolk.

3. The complex according to claim 1, which is a dried powder.

4. A food product containing the complex according to claim 1.

5. A processed egg product containing the complex according to claim 1.

6. A drink containing the complex according to claim 1.

7. A seafood product containing the complex according to claim 1.

8. A processed meat product containing the complex according to claim 1.

9. A condiment containing the complex according to claim 1.

10. A confection containing the complex according to claim 1.

11. A noodle containing the complex according to claim 1.

12. An ice cream containing the complex according to claim 1.

13. The complex according to claim 1, wherein the plant sterol comprises β-sitosterol, stigmasterol, campesterol, brassicasterol, plant stanol or mixtures thereof.

14. The complex according to claim 1, wherein the complex is dispersed in a water-based medium.

15. The complex according to claim 1, wherein the plant sterol is used in the form of flakes or powder during production of the complex.

16. The complex according to claim 1, wherein the egg yolk lipoprotein covers the plant sterol.

17. The complex according to claim 1, wherein the complex has dispersibility such that a floating layer is not seen in a liquid dispersion when the complex is dispersed in a 0.9% sodium chloride solution so that the concentration of plant sterol is 15% by mass, and when the complex is exposed to ultrasound for 1 minute and left to stand at room temperature for 1 hour.

18. A method for manufacturing a complex comprising plant sterol and egg yolk lipoprotein, the method comprising stirring and mixing the egg yolk lipoprotein and plant sterol in a water-based medium, wherein a component ratio of the plant sterol to the egg yolk lipoprotein is 5 to 232 parts by mass of plant sterol per 1 part by mass of egg yolk lipoprotein.

19. The method for manufacturing the complex according to claim 18, wherein egg yolk liquid is used as the egg yolk lipoprotein.

20. The method for manufacturing the complex according to claim 19, wherein 4 to 185 parts by mass of plant sterol is used per 1 part by mass of egg yolk solids.

21. The method for manufacturing the complex according to claim 18, wherein a dilute egg yolk liquid is used as the egg yolk lipoprotein.

22. The method for manufacturing the complex according to claim 21, wherein the stirring and mixing of the dilute egg yolk liquid and the plant sterol is conducted at a temperature of from about 45° C. to about 55° C.

23. The method for manufacturing the complex according to claim 18, wherein the mean grain size of the plant sterol is 50 μm or less.

24. The method for manufacturing the complex according to claim 18, wherein the plant sterol is stirred and mixed in the form of flakes or powder.

25. The method for manufacturing the complex according to claim 18, wherein a mean grain size of the plant sterol is 10 μm or less.

* * * * *